United States Patent
Kirejczyk

(10) Patent No.: US 6,862,846 B1
(45) Date of Patent: Mar. 8, 2005

(54) DOOR MODULE FOR A MOTOR VEHICLE WITH PIVOTALLY ATTACHED SECTIONS

(75) Inventor: Juliusz Kirejczyk, Newmarket (CA)

(73) Assignee: Atoma International Corp., Newmarket (CA)

( * ) Notice: Subject to any disclaimer, the term of this patent is extended or adjusted under 35 U.S.C. 154(b) by 0 days.

(21) Appl. No.: 09/959,064

(22) PCT Filed: Apr. 19, 2000

(86) PCT No.: PCT/CA00/00412

§ 371 (c)(1),
(2), (4) Date: Feb. 11, 2002

(87) PCT Pub. No.: WO00/63039

PCT Pub. Date: Oct. 26, 2000

Related U.S. Application Data

(60) Provisional application No. 60/130,138, filed on Apr. 20, 1999.

(51) Int. Cl.[7] .................................................. B60J 5/04
(52) U.S. Cl. ...................................... 49/502; 296/146.7
(58) Field of Search ................ 49/502, 352; 296/146.5, 296/146.7, 146.13

(56) References Cited

U.S. PATENT DOCUMENTS

| | | | |
|---|---|---|---|
| 4,588,627 A | * | 5/1986 | Isaksen et al. ................. 428/80 |
| 4,866,883 A | | 9/1989 | Brown et al. |
| 4,949,508 A | * | 8/1990 | Elton ....................... 296/146.7 |
| 5,048,234 A | * | 9/1991 | Lau et al. ...................... 49/502 |
| 5,050,347 A | * | 9/1991 | Brusasco ...................... 49/348 |
| 5,050,350 A | | 9/1991 | Bertolini et al. |
| 5,090,158 A | | 2/1992 | Bertolini et al. |
| 5,095,659 A | | 3/1992 | Benoit et al. |
| 5,251,403 A | | 10/1993 | Compeau et al. |
| 5,379,553 A | * | 1/1995 | Kimura et al. ................. 49/502 |
| 5,433,041 A | | 7/1995 | Filippi |
| 5,469,662 A | | 11/1995 | TenBrink et al. |
| 5,857,732 A | | 1/1999 | Ritchie |
| 5,904,002 A | | 5/1999 | Emerling et al. |
| 5,906,072 A | | 5/1999 | Feige et al. |
| 6,161,337 A | * | 12/2000 | Morando ...................... 49/352 |
| 6,354,652 B1 | * | 3/2002 | Arquevaux et al. ...... 296/146.5 |
| 6,381,906 B1 | * | 5/2002 | Pacella et al. ........... 296/146.5 |
| 6,438,899 B1 | * | 8/2002 | Feder et al. .............. 296/146.7 |
| 6,510,657 B1 | * | 1/2003 | Bertolini et al. .............. 49/502 |

FOREIGN PATENT DOCUMENTS

| | | |
|---|---|---|
| DE | 196 53 501 A1 | 12/1995 |
| DE | 197 07 850 C1 | 2/1997 |

* cited by examiner

Primary Examiner—Gregory J. Strimbu
(74) Attorney, Agent, or Firm—Clark Hill PLC

(57) ABSTRACT

A carrier plate assembly (26) is secured to an inner pannel (22) of a vehicle door. The carrier plate assembly includes a main section (46) having a forward edge and a rearward edge (50). A first flap section (54) is connected to the main section along the forward edge by a hinge and is detachably connected to the inner panel for movement about the hinge to provide access to the space within the door without removing the entire carrier plate assembly. A second flap section (56) is connected to the rearward edge (50) by a second hinge to provide access to the hardware components in the space within the door.

17 Claims, 8 Drawing Sheets

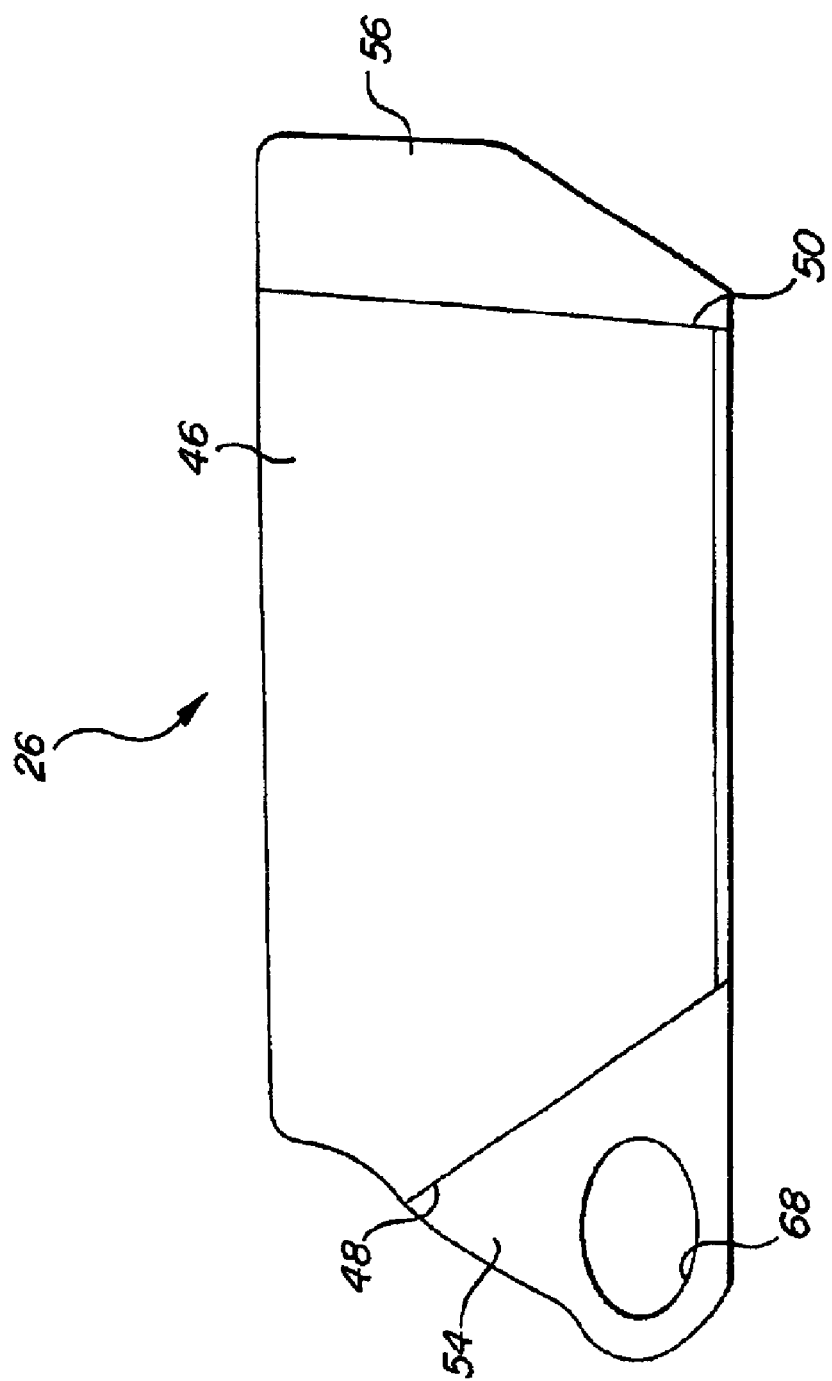

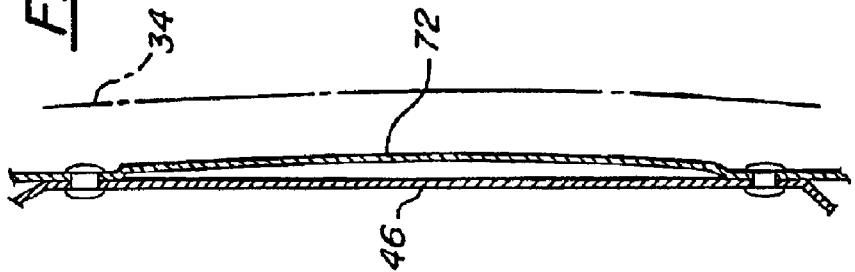
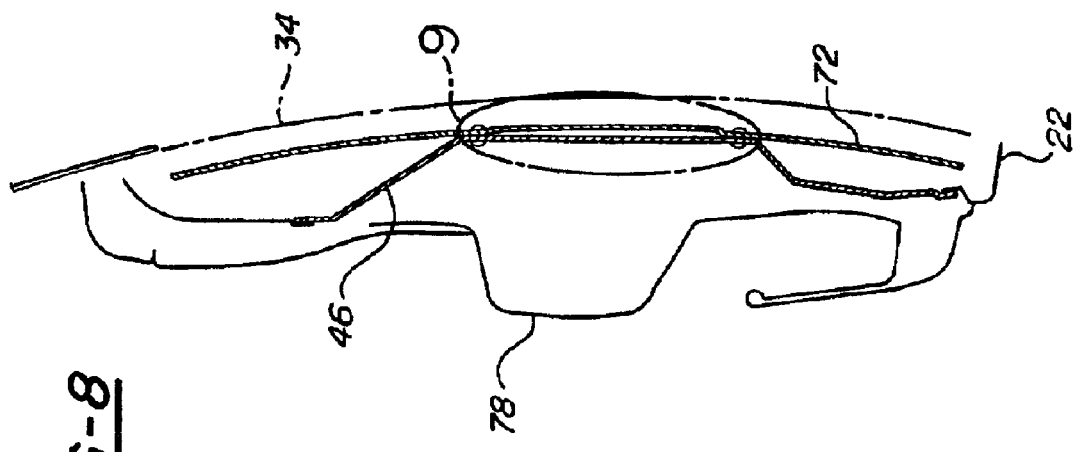

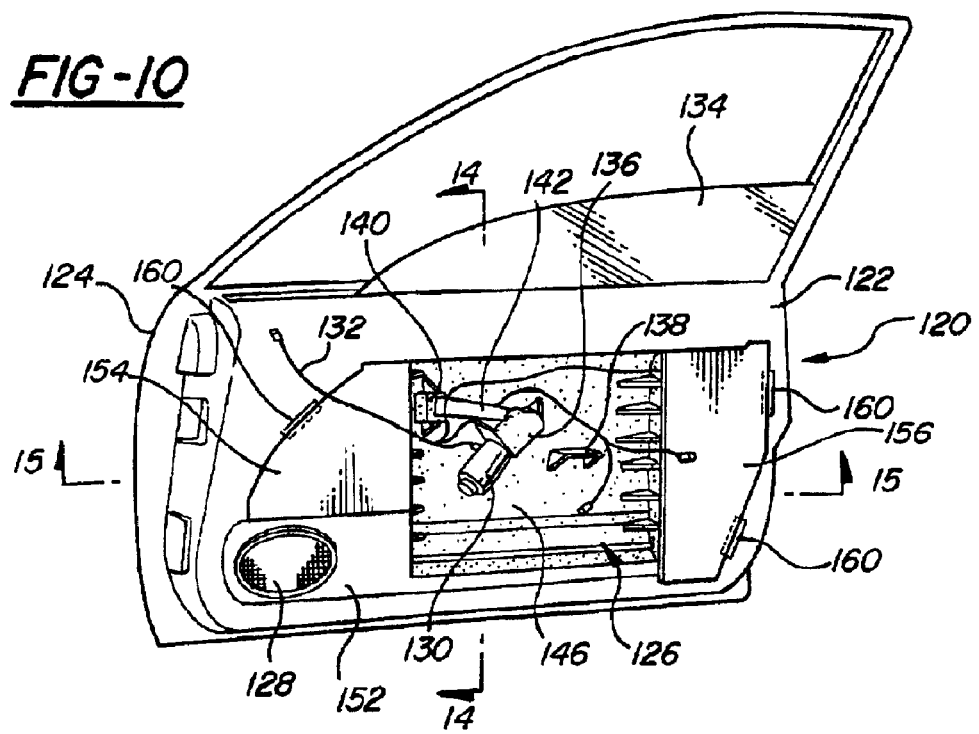

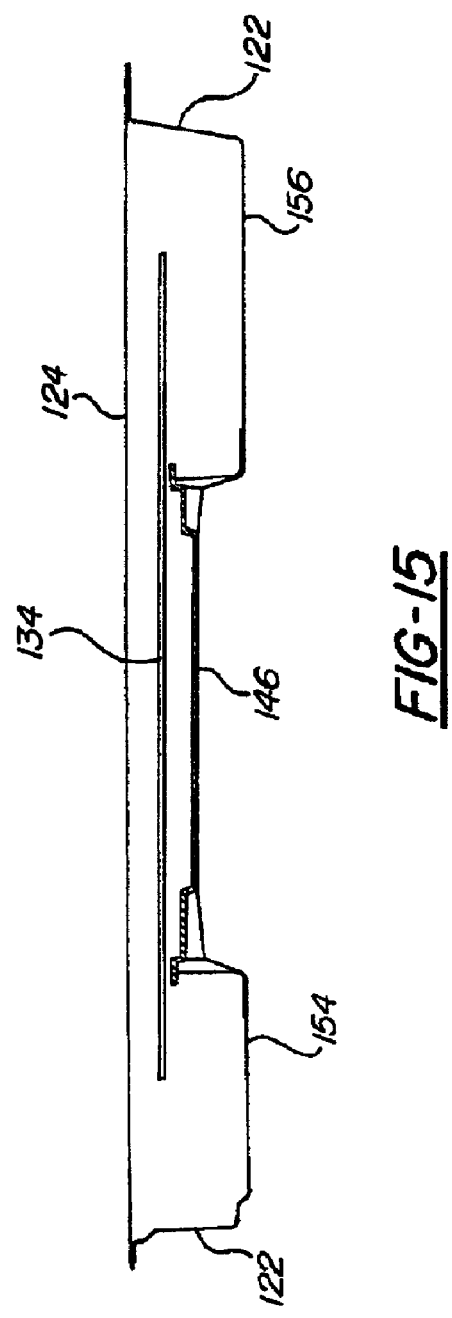
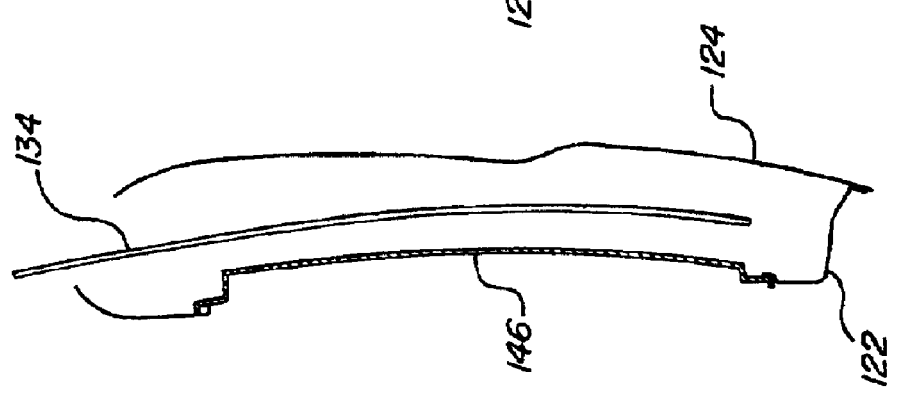

DOOR MODULE FOR A MOTOR VEHICLE WITH PIVOTALLY ATTACHED SECTIONS

This application is a 371 of PCT/CA00/00412 filed Apr. 19, 2000 which claims the benefit of U.S. provisional application No. 60/130,138 filed Apr. 20, 1999.

FIELD OF THE INVENTION

The subject invention relates to a carrier plate assembly for a vehicle door having inner and outer panels with an access opening in the inner panel. The carrier plate assembly is removably secured to the inner panel to overlie and seal the opening and provide selective access to the inner space of the door.

BACKGROUND OF THE INVENTION

Inner and outer panels of a vehicle door are connected together to define a space therebetween for housing various door hardware components. Access to the hardware components for installation and repair is accommodated by the opening in the inner panel. In most instances a carrier plate covers this opening. The carrier plate must be removed from the inner panel for access to this inner space. Examples of such prior assemblies are shown in U.S. Pat. No. 5,050,350 to Bertolini et al. and U.S. Pat. No. 5,090,158 to Bertolini. The removal of the carrier plate is time consuming and labor intensive.

The automotive parts supply industry has been evolving toward the supply of not merely individual parts but the supply of modules. Modules have the advantage of providing a greater number of parts and functionality into a single module while being easier and quicker to install on an assembly line.

Door modules have been proposed which include a carrier plate having a number of hardware components. In order to render the inner space more accessible without totally disconnecting the carrier plate from the inner panel of the door, the entire carrier plate has been hingedly connected to the door panels, as is shown in U.S. Pat. No. 4,866,883 to Brown et al. and U.S. Pat. No. 5,906,072 to Feige et al. The prior art hinged carrier plates are relatively large and are actually the majority of the inner panel of the door itself. The structural integrity of the door is therefore compromised. In addition, the known hinged carrier plates are labor intensive to disconnect.

In addition to the access problem with the prior art assemblies, the carrier plates must be sealed to the inner door panel to prevent moisture from gaining access to the inner space and the hardware disposed therein. Many of the prior art door modules have a disadvantage in that once the module is installed, a separate vapor barrier must be utilized in order to seal the door and maintain a relatively dry environment for the operation of the hardware components of the door.

Accordingly, there is a need for a carrier plate which can be efficiently manipulated to provide access to the interior space of the door while adequately sealing the door to prevent the ingress of moisture.

SUMMARY OF THE INVENTION

The subject invention is an improvement over the prior art carrier plates that are mounted to an inner panel of a vehicle door. The carrier plate assembly includes a main section having at least one mounting area where door hardware is mountable thereon. At least one flap section is connected to the main section by a hinge and is movable about the hinge to provide access behind the inner panel of the door without removing the carrier plate.

Accordingly, the subject invention provides a carrier plate which may be pre-assembled with hardware. The carrier plate has a flap section extending from the main section. The main section may be mounted to the inner door panel while allowing access to the interior by opening the flap section. Once the installation of the carrier plate is complete, the flap section is folded against the inner panel and sealed thereto to hermetically seal the door. In the event the hardware in the inner space of the door must be serviced at a later date, the flap section may be opened without removing the entire carrier plate to gain access to the hardware needing repair.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a side elevational view of the carrier plate of FIG. 1;

FIG. 8 is a cross sectional view taken along line 8—8 of FIG. 1;

FIG. 9 is a partial sectional view of a door module attachment of FIG. 8;

FIG. 10 is a side elevational view of a vehicle door incorporating an alternative embodiment of the carrier plate assembly of the present invention;

FIG. 11 is an exploded perspective view of the alternative carrier plate assembly of FIG. 10;

FIG. 14 is a cross sectional view taken along line 14—14 of FIG. 10; and

FIG. 15 is a cross sectional view taken along line 15—15 of FIG. 10.

DETAILED DESCRIPTION OF THE PREFERRED EMBODIMENTS

Figure 1:
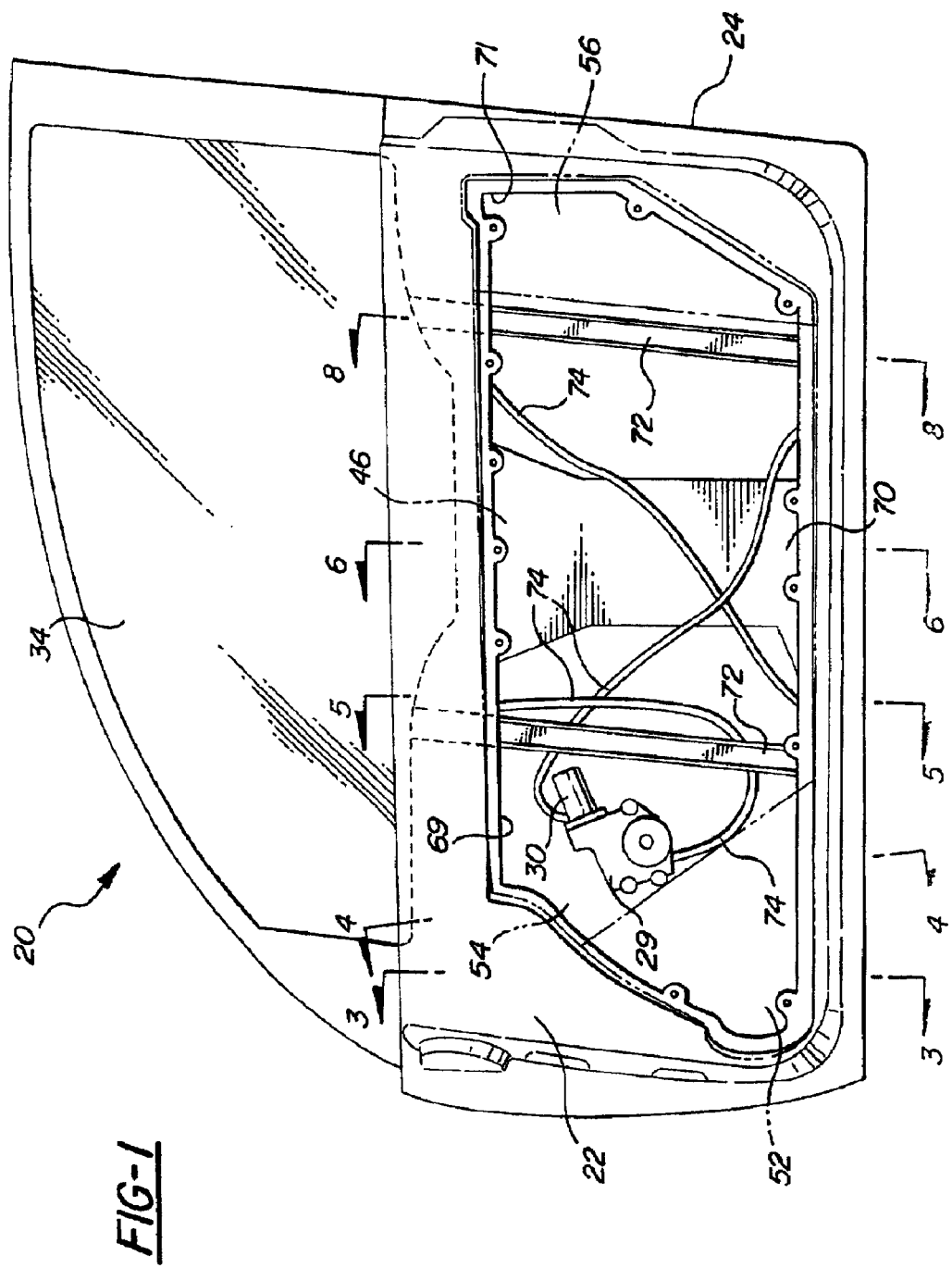
FIG. 1 is a side elevational view of a vehicle door with a carrier plate assembly of the subject invention shown in phantom.

Referring to the Figures, wherein like numerals indicate like or corresponding parts throughout the several views, a vehicle door for hinged mounting on a vehicle body is generally shown at 20 in FIG. 1.

The door 20 includes an inner panel 22 and an outer panel 24 connected together about peripheries thereof to define an inner space or cavity therebetween for housing door hardware components. The panels 22, 24 are typically made of sheet metal and are hemmed together about respective peripheries. The inner panel 22 preferably has a pair of openings 69, 71 formed therein for access to the space between the panels 22, 24. A bridge 70 extends vertically between the openings 69, 71 to present a structure for supporting an armrest. The bridge 70 is preferably integral with the inner panel 22. Additionally, the bridge 70 enhances stiffness of the door 20.

Referring also to FIG. 2, a carrier plate assembly, generally indicated at 26, is secured to the inner panel 22 and is sized to cover both of the openings 69, 71. The carrier plate assembly 26 includes a main section 46 which is secured to the inner panel 22 by clips, fasteners, or the like. Preferably, the main section 46 is secured to the inner panel 22 at the bridge 70. The main section 46 has at least one mounting area where door hardware is mountable thereon as is discussed in greater detail below. The main section 46 includes a forward edge 48 and a rearward edge 50. A first flap section 54 extends from the main section 46 at a hinge and is detachably connected to the inner panel 22 for pivotal movement about the hinge. Similarly, a second flap section 56 is connected to the rearward edge 50 by a second hinge. Preferably, the main section 46 and flap sections 54, 56 are integrally formed of an organic polymeric material, i.e. plastic, whereby the hinges are integral living hinges.

The first flap section 54 has a mounting area in the form of hole 68 for mounting a conventional audio speaker 28. Other mounting areas are disposed on the main section 46 of the carrier plate assembly 26 for mounting various door components thereon. It is preferred that substantially all of the hardware components for the door are mounted to the carrier plate assembly 26. The carrier plate assembly 26 of this embodiment is preferably designed of a non-structural material such that the hardware components are transported thereon. The hardware components can be then mounted directly to the inner panel 22 of the door 20 as is discussed below. The carrier plate assembly 26 positions or aligns each of the components at the desired position on the inner panel 22. The non-structural material of the carrier plate assembly 26 is sufficiently supportive to transport the carrier plate assembly 26 with the hardware components thereon.

As illustrated, a pair of rails 72 are mounted to the main section 46. Once the carrier plate assembly 26 is installed, the rails 72 are bolted or otherwise affixed to the inner panel 22 for guiding a window 34 therealong. A window regulator component 29, either manual or power, is also mounted to the main section 46. The window regulator component 29 is also mounted to the inner panel 22 once the carrier plate assembly 26 is mounted to the door 20. The window regulator component 29 includes a series of cables 74 connected between a motor 30 and the window 34 for moving the window 34 along the rails 72. The cables 74 pass between the bridge 70 and the carrier plate assembly 26.

As illustrated, the motor 30 can be mounted forwardly of the rails 72 rather than between the rails 72 as is conventional. The forward mounting of the motor 30 is advantageous in that the mass of the motor 30 is closer to the axis of rotation of the door 20 during opening and closing thereby reducing the inertia of the door 20.

Door latch components, including a latch, an inside release handle and an inside door lock mechanism are mounted on the carrier plate assembly 26.

A bead of sealing compound (not shown) may be disposed about the periphery of the main section 46 and the flap sections 54, 56 for sealing the carrier plate assembly 26 to the inner panel 22, thereby defining a "dry" side on the inner space and a "wet" side on the exterior. The sealing surface of the inner panel 22 follows the shape of the entire carrier plate assembly 26. Any control cables or the like which must pass through the carrier plate assembly panel 26 can be sealed with grommets as is conventional in the art.

Figure 5:
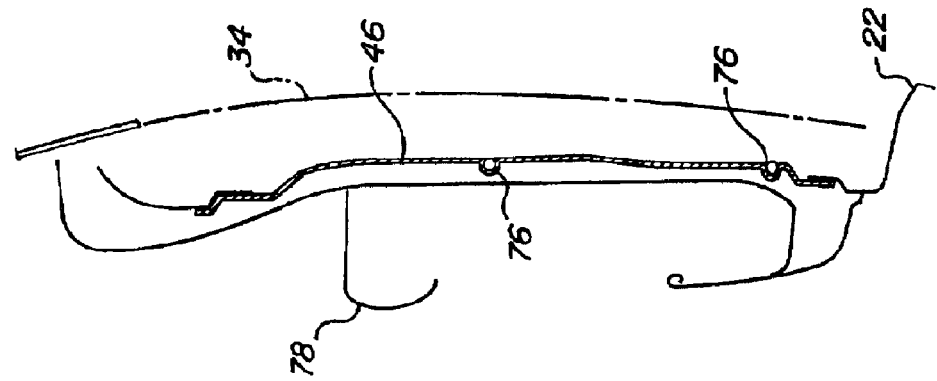
FIG. 5 is a cross sectional view taken along line 5—5 of FIG. 1.
Figure 4:
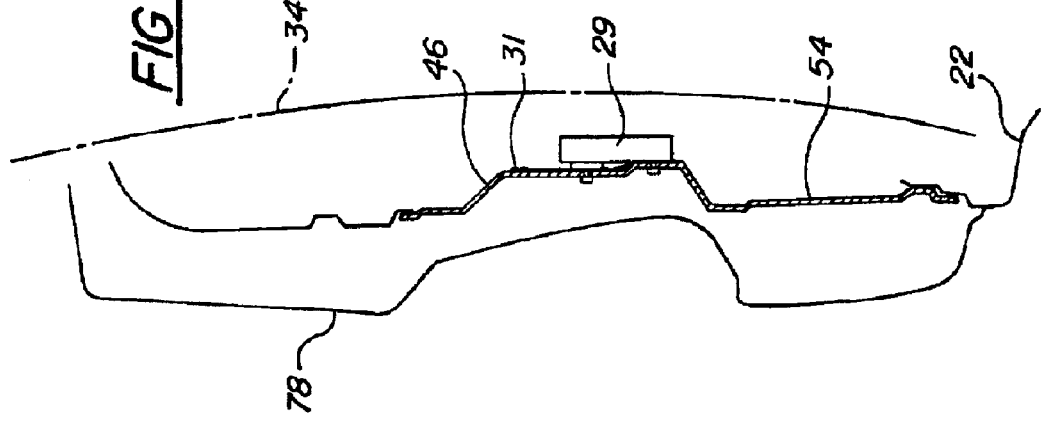
FIG. 4 is a cross sectional view taken along line 4—4 of FIG. 1.
Figure 3:
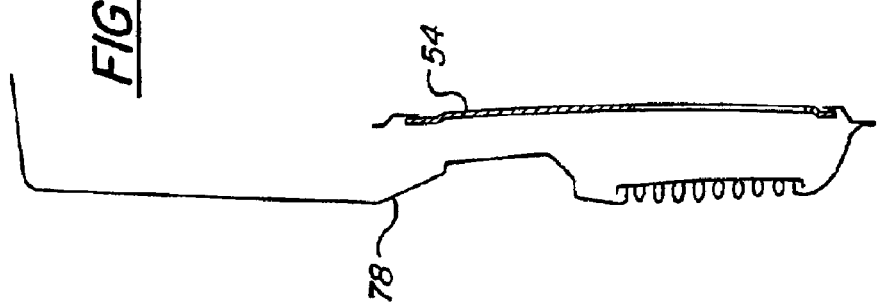
FIG. 3 is a cross sectional view taken along line 3—3 of FIG. 1.
Figure 7:
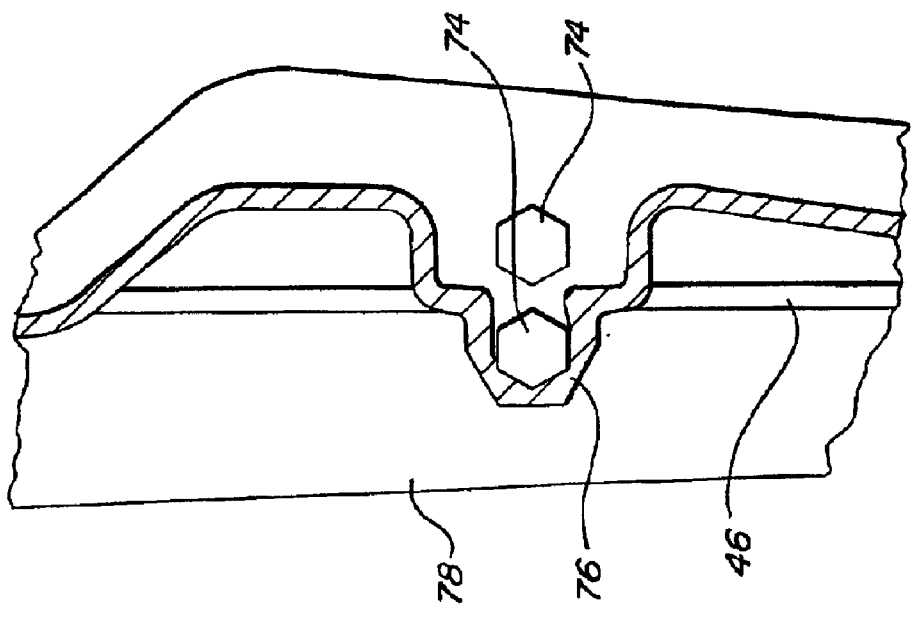
FIG. 7 is a partial sectional view of a regulator cable attachment of FIG. 6.
Figure 6:
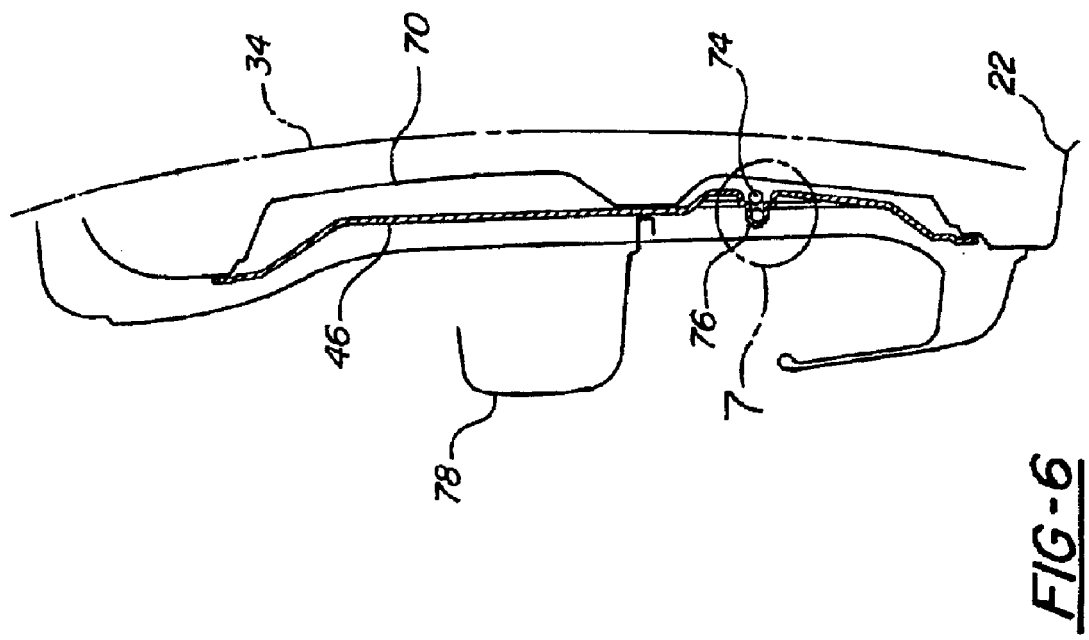
FIG. 6 is a cross sectional view taken along line 6—6 of FIG. 1.

Referring to the sectional views of FIGS. 3 through 9, the carrier plate assembly 26 is illustrated in greater detail. In particular, FIG. 3 further illustrates the first flap section 54 and FIGS. 4, 5, 6 and 8 further illustrate the main section 46 of the carrier plate assembly 26. As shown in FIG. 4, the window regulator component 29 is mounted to the main section 46 by a bracket 31. As shown in FIGS. 5–7, the main section 46 of the carrier plate assembly 26 also includes integrally molded cable guides 76 for housing the cables 74 that move the window 34. As appreciated, there may also be integrally molded guides for an electrical harness.

The carrier plate assembly 26 is pre-assembled and shipped to the assembly plant in the pre-assembled condition. On the assembly line, the carrier plate assembly 26 is placed on the inner panel 22 with the rails 72 being positioned in the inner space. The carrier plate assembly 26 seals to the continuous sealing surface of the inner panel 22. Fasteners (not shown) attach the main section 46 of the carrier plate assembly 26 to the inner panel 22 in the region of the bridge 70. The door latch 44, which was attached to the carrier plate assembly 26 for shipping, is secured to the end region of the door panel 22.

The flap sections 54, 56 are hinged open to provide access to the inner space. Hence, an installer may install the door latch 44 and make all necessary connections with inner and outer door handles through the second or rear flap section 56. Electrical connections to the speaker 28 and the wiring harness 32 can be made through the first or forward flap section 54. The window 34 can be connected to the control cables 74 through both flap sections 54, 56. Once all of the mountings and connections have been made, the flap sections 54, 56 are pivoted about their respective hinges to the closed position overlying and sealing the openings 69, 71, as by a gasket seal or adhesive 60.

An interior door panel 78, best shown in FIGS. 3–6 and 8, can then be installed to the inner panel 22 to present an aesthetically pleasing covering.

Figure 13:
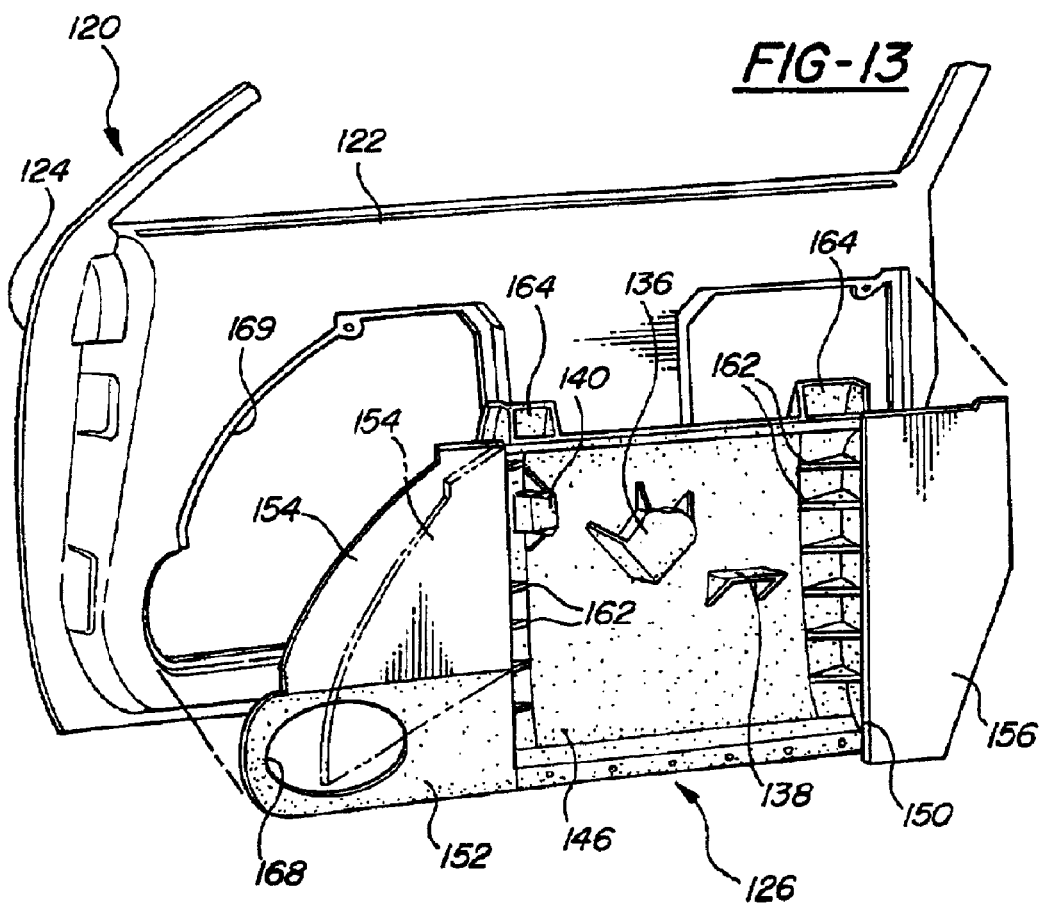
FIG. 13 is a fragmentary perspective view of the vehicle door in combination with the alternative carrier plate assembly of FIG. 10 and with the an open position shown in phantom.

Referring now to FIG. 10, an alternative embodiment of the subject invention is illustrated wherein like numerals increased by 100 indicate like or corresponding parts throughout the several views. A door 120 is illustrated having a similar construction as the door 20 of the primary embodiment. In particular, the door 120 includes an inner panel 122 and an outer panel 124 connected together in spaced relationship with one another to define an inner space therebetween for housing door hardware components. The inner panel 122, however, has only one large opening 169 for providing access into the space as is shown in FIG. 13.

A carrier plate assembly 126 is formed of a rigid material is illustrated in this embodiment. The rigid carrier plate assembly 126 is designed to support a number of the door hardware components thereon during the shipping of the plate assembly 126. In particular, an audio speaker 128, motor 130, and electrical harness 132 are all illustrated as being supported by the carrier plate assembly 126. The motor 130 and electrical harness 132 are preferably part of a window regulator component 129 for moving a window 134. As appreciated, any hardware or like component which is part of the door 120 may be mounted to the carrier plate assembly 126.

The rigid carrier plate assembly 126 of this alternative embodiment is designed of a structural material such that the hardware components transported thereon remain mounted to the carrier plate assembly 126. Hence, the carrier plate assembly 126 is first installed onto the door 120, the hardware components are then connected, and no additional mounting of the parts is necessary.

Figure 12:
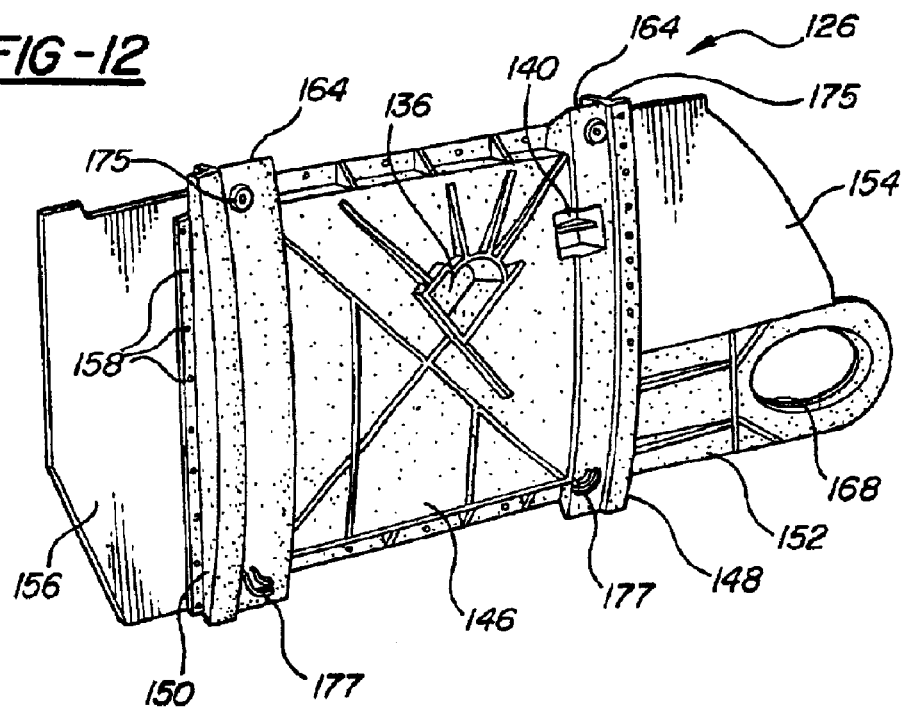
FIG. 12 is a perspective view of the alternative carrier plate assembly of FIG. 10.

Referring to FIGS. 11 and 12, the carrier plate assembly 126 is shown in greater detail with the speaker 128, motor 130 and electrical harness 132 spaced therefrom. The carrier plate assembly 126 includes an outer face, as shown in FIG. 11, and an inner face, as shown in FIG. 12. The speaker 128, motor 130 and electrical harness 132 are preferably mounted to the outer face of the carrier plate assembly 126. Integral pockets and/or mounts 136, 138, 140 are included on the carrier plate assembly 126 for supporting the various hardware components. In particular, the motor 130 is supported by the mount 136. A gearbox (not shown) is disposed within the pocket formed by mount 136 (best shown in FIG. 12). The mount 136 also includes a sealed opening for allowing the motor 130 to engage the gearbox. The mount 136 can be designed to directly accommodate the gears of the gearbox thereby allowing a separate gearbox housing to be eliminated. The mount 140 is molded at the desired location to support a door handle mechanism 142. The platform mount 138 is presented to reinforce an armrest (not shown). The electrical harness 132 electrically interconnects the motor 130 and control buttons (not shown). A door latch 144 is connected via a cable to the door handle 142.

As is common with the carrier plate assembly 26 of the first embodiment, the carrier plate assembly 126 includes a main section 146 secured to the inner panel 122 by clips, fasteners, or the like. The main section 146 includes a forward edge 148 and a rearward edge 150 with an arm 152 extending forwardly from the forward edge 148. A first flap section 154 is connected to the main section 146 by a hinge and is detachably connected to the inner panel 122 for movement about the hinge to access the inner space without removing the entire carrier plate assembly 126. Preferably, the first flap section 154 is disposed above the arm 152 and along the forward edge 148. A second flap section 156 is connected to the rearward edge 150 by a second hinge.

The main section 146 and the flap sections 154, 156 of the carrier plate assembly 126 are preferably formed of a rigid material. Even more preferably, the main section 146 and flap sections 154, 156 are formed of an integral organic polymeric material, i.e. plastic. The flap sections 154, 156 are connected to the rigid main section 146 by rivets 158, or the like, as shown in FIG. 12. As appreciated, the flap sections 154, 156 may be alternatively adhered to the main section 46 by an adhesive. The flap sections 154, 156 are preferably formed of a soft or malleable material such that a living hinge can be formed on the flap sections 154, 156. In the event the flap sections 154, 156 are of paper board or the like, a moisture impervious layer or sheet (not shown) is adhered thereto to present a moisture barrier.

Tape 160 (shown in FIG. 10) or other like adhesive may be employed to secure the flap sections 154, 156 to the inner panel 122. A bead of sealing compound (not shown) may be disposed about the periphery of the main section 146 and the flap sections 154, 156 for sealing the carrier plate assembly 126 to the inner panel 122, thereby defining a "dry" side on the interior of the space and a "wet" side on the exterior. In particular, the carrier plate assembly 126 is sealed to an inner side of the inner panel 122 (best shown in FIG. 14).

The rigid main section 146 includes reinforcing ribs 162 on both sides thereof. The main section 146 is generally rectangular and includes two vertically curved channels 164, which support integrally molded cable guides 177 and pulleys 175. The channels 164 define the two curved edges 148, 150 which curvature reflects that of the window 134. Hence, the edges 148, 150 form the rails for window regulator lift plates 166. The integrally molded cable guides 177 and pulleys 175 receive window regulator cables (not shown) for moving the window 134. In particular, the window regulator cables are routed through the guides 177 and pulleys 175 and then attached to the lift plates 166. The arm 152 also has a mount in the form of an oval hole 168 in the main section 146 with the audio speaker 128 disposed in the hole 168.

FIGS. 14 and 15 illustrate cross-sectional views through the inner 122 and outer 124 panels and the alternative carrier plate assembly 126 of FIG. 10.

The carrier plate assembly 126 of this alternative embodiment is pre-assembled and shipped to the assembly plant in a similar pre-assembled condition as the first embodiment. On the assembly line, the carrier plate assembly 126 is placed on the inner panel 122. As discussed above, the carrier plate assembly 126 is sealed to an inner side of the inner panel 122 (best shown in FIG. 14). Fasteners (not shown) attach the main section 146 of the carrier plate assembly 126 to the inner panel 122.

The flap sections 154, 156 are hinged open to provide access to the interior space. Hence, an installer may install the door latch 144 and make all necessary mechanical and electrical connections with inner and outer door handles through the second or rear flap section 156. Electrical connections to the speaker 128 and the wiring harness 132 can be made through the first or forward flap section 154. The window 134 can be connected to the lift plates 166 through both flap sections 154, 156. As discussed above, no additional mounting of the hardware components is necessary. Once all of the connections have been made, the flap sections 154, 156 are pivoted about their respective hinges to the closed position overlying and sealing the opening 169.

The flaps sections 154, 156 are sealed to the inner panel 122 to seal the periphery of the carrier plate assembly 126. An interior door panel, not shown but similar to the door panel of the primary embodiment, can then be installed to the inner panel 122 to present an aesthetically pleasing covering.

Many modifications and variations of the present invention are possible in light of the above teachings. The invention may be practiced otherwise than as specifically described within the scope of the appended claims.

What is claimed is:

1. A motor vehicle door, comprising:

inner and outer sheet metal panels defining a cavity therebetween, the inner panel including at least one opening therein providing access to the cavity;

a carrier plate having a plurality of operating mechanisms mounted thereon, the carrier plate being formed from a substantially water-impervious material and covering and sealing the at least one access opening when the carrier plate is mounted to the inner panel, and sealing a wet side from a dry side of the door; and an interior door trim, covering at least a portion of the carrier plate;

wherein the carrier plate includes an integral hinge defining a flap section moveable about the hinge relative to the carrier plate in order to provide access to only a portion of the cavity without removal of the carrier plate from the door.

2. A door as set forth in claim 1 wherein said hinge is a living hinge integrally connecting a main section of said carrier plate and said flap section.

3. A door as set forth in claim 2 wherein said main section includes a forward edge and a rearward edge, said hinge being disposed along said forward edge, and said main section further including a second flap section integrally connected to said rearward edge by a second living hinge.

4. A door as set forth in claim 3 wherein said main section has an integrally molded cable guide adapted to receive a cable of a window regulator.

5. A door as set forth in claim 3 wherein said main section has a window regulator assembly mounted thereto.

6. A door as set forth in claim 1 wherein said carrier plate comprises a main section connected to said flap section via said hinge, said main section is formed of a rigid material.

7. A door as set forth in claim 6 wherein said main section further includes reinforcing ribs.

8. A door as set forth in claim 6 wherein said flap section is formed of a moisture impervious material.

9. A door as set forth in claim 6 wherein said flap section consists of a different material than said main section.

10. A door as set forth in claim 6 wherein said main section includes a forward edge and a rearward edge and an arm extending forwardly from said forward edge, said flap section being disposed above said arm and along said forward edge.

11. A door as set forth in claim 10 wherein said arm includes a hole for receiving an audio speaker.

12. A door as set forth in claim 10 including a second flap section connected to said rearward edge by a second hinge.

13. A door as set forth in claim 6 wherein said main section includes integral channels defining a pair of guides for regulating movement of a window.

14. A door as set forth in claim 13 wherein said channels include lift plates in sliding engagement with said channels for supporting the window.

15. A door as set forth in claim 6 wherein said main section includes integral pockets.

16. A door as set forth in claim 1 wherein said flap section includes a hole for receiving an audio speaker.

17. A door as set forth in claim 1 further including adhesive tape for securing said flap section to the inner panel.

* * * * *